US006243247B1

(12) United States Patent
Akdag et al.

(10) Patent No.: US 6,243,247 B1

(45) Date of Patent: Jun. 5, 2001

(54) STRIPLINE TRANSIENT PROTECTION DEVICE

(75) Inventors: Omer Akdag, Reno; Ted K. Kulbieda, Carson City; Roger Bishop, Dayton, all of NV (US)

(73) Assignee: PolyPhaser Corporation, Minden, NE (US)

( * ) Notice: Subject to any disclaimer, the term of this patent is extended or adjusted under 35 U.S.C. 154(b) by 0 days.

(21) Appl. No.: 09/294,853

(22) Filed: Apr. 20, 1999

Related U.S. Application Data

(60) Provisional application No. 60/101,426, filed on Sep. 22, 1998.

(51) Int. Cl.[7] ........................ H02H 3/22

(52) U.S. Cl. ........................ 361/111; 361/119

(58) Field of Search ........................ 361/111, 117, 361/118, 119, 126, 127, 753, 766, 780, 738, 794, 799, 800, 816, 818; 333/12, 246, 247

(56) References Cited

U.S. PATENT DOCUMENTS

| | | | | |
|---|---|---|---|---|
| 4,586,104 | * | 4/1986 | Standler | 361/91 |
| 5,442,330 | * | 8/1995 | Fuller et al. | 333/204 |

* cited by examiner

*Primary Examiner*—Ronald W. Leja
(74) *Attorney, Agent, or Firm*—Sheppard, Mullin, Richter & Hampton LLP; Ketan S. Vakil

(57) ABSTRACT

Apparatus for protecting electronic components and equipment and method of manufacturing the apparatus. A transient protection device capable of mounting onto a circuit board. The transient protection device includes first and second conductive paths. The first conductive path lies in a first plane and the second conductive path lies in a second plane spaced apart from the first plane. Furthermore, a dielectric material lies in a third plane disposed between the first and the second plane. A ground plane is coupled with said first conductive path to discharge an electrical surge.

22 Claims, 5 Drawing Sheets

STRIPLINE TRANSIENT PROTECTION DEVICE

CROSS-REFERENCES TO RELATED APPLICATIONS

This patent application claims priority from U.S. Provisional Patent Application No. 60/101,426, entitled "STRIPLINE TRANSIENT PROTECTION DEVICE," filed Sep. 22, 1998, the disclosure of which is herein incorporated by reference for all purposes.

BACKGROUND OF THE INVENTION

The present invention relates generally to stripline and microstrip electronic circuits and more particularly to electronic circuits that provide protection from transients generated by electrical surges and electromagnetic (EM) phenomena such as lightning.

Communications equipment, computers, home stereo amplifiers, televisions, and other electronic devices are manufactured using small electronic components that are very vulnerable to damage from electrical energy surges. Surge variations in transmission line power and voltages, as well as noise, can change the operating range of the equipment and can severely damage and/or destroy electronic components and devices. Moreover, these electronic components and devices can be very expensive to repair and replace.

There are many sources that can cause harmful electrical energy surges. One source is radio frequency (RF) interference that can be coupled to power and transmission lines from a multitude of sources. The power and transmission lines act as large antennas that may extend over several miles, thereby collecting a significant amount of RF noise from such sources as radio broadcast antennas. Another source of the harmful electrical energy is power surges caused by power outages or loss in power to a particular electronic component. In some instances, power to an electronic component is lost and thereafter restored causing a surge to travel across a computer board. Another harmful source is conductive noise, which is generated by equipment connected to the power and transmission lines and which is conducted along the power lines to the equipment to be protected. Still another source of harmful electrical energy is lightning. Lightning is complex electromagnetic energy source having potentials estimated at from 5 million to 20 million volts and currents reaching thousands of amperes.

Ideally, what is needed is an electronic component having a low insertion loss, a low voltage standing wave ratio (VSWR), and a compact size that can be mounted on a circuit board, i.e., a RF board, to provide surge protection.

SUMMARY OF THE INVENTION

The present invention provides a transient protection device for use in microstrip circuits. The transient protection device provides a low impedance path to ground to dissipate electromagnetic energy, i.e. transient currents, while minimizing throughput voltage to electronic components. In addition, the transient protection device provides a low insertion loss and a low VSWR. The transient protection device is preferably suitable for surface mount technology such as mounting onto a circuit board.

According to an aspect of the present invention, the transient protection device has three ports: a surge port, a protected port, and a ground port. The surge port receives and/or transmits transmission signals from and to a communication line and receives a surge or electrical energy from a communication line such as a transmission line. The ground port dissipates or discharges the surge or electrical energy to a system ground. The protected port receives and/or transmits transmission signals from and to the circuit board or electronic components and equipment.

According to another aspect of the present invention, the surge suppressor includes first and second conductive paths. The first conductive path lies in a first plane and the second conductive path lies in a second plane spaced apart from the first plane. Furthermore, a dielectric material lies in a third plane disposed between the first and the second plane. A ground plane is coupled with the first conductive path to discharge an electrical surge.

Advantages of the invention include a surge suppressor capable of being mounted on a circuit board. Furthermore, the transient protection device provides a ground port isolated from a circuit board ground to prevent surge energy on the ground port from penetrating onto the circuit board via the circuit board ground. Additionally, the transient protection device has a metallic coating to provide an RF shield. Still yet another advantage is that the transient protection device includes a dielectric layer to block or attenuate surge energy from traveling to electronic chips and components.

A further understanding of the nature and advantages of the inventions herein may be realized by reference to the remaining portions of the specification and the attached drawings.

DESCRIPTION OF THE SPECIFIC EMBODIMENTS

In the description that follows, the present invention will be described in reference to a preferred embodiment that operates as a transient protection device. In particular, examples will be described which illustrate particular features of the invention. The present invention, however, is not limited to any particular features or limited by the examples described herein. Therefore, the description of the embodiments that follow is for purposes of illustration and not limitation.

Figure 1:
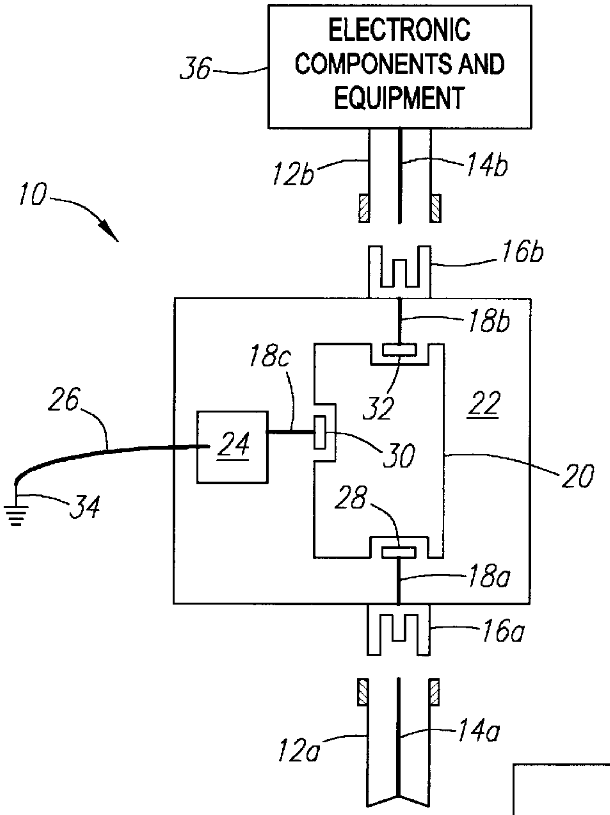
FIG. 1 depicts a simplified view of a communication system according to an embodiment of the present invention.

FIG. 1 depicts a simplified view of a communication system according to an embodiment of the present invention. Communication system 10 includes transmission lines 12*a,* 12*b,* connectors 16*a,* 16*b,* circuit board 22, transient protection device 20, system ground 34, and electronic components and equipment 36. Transmission lines 12*a,* 12*b* are generally co-axial cables having inner conductors 14*a,* 14*b,* respectively, capable of propagating transmission signals, e.g., radio frequency (RF) and microwave frequency signals. For simplicity, transmission lines 12*a,* 12*b* will be described as co-axial cables, however, transmission lines 12*a,* 12*b* may be a system of conductors, a wave guide, shielded cables, tubes, parallel wires, and twisted-wire pairs. Furthermore, transmission line 12*a* can be different than transmission line 12*b*. For example, transmission line 12*a* can be a co-axial cable and transmission line 12*b* can be a wave guide. In an aspect of the invention, transmission line 12*b* and connector 16*b* can be removed and the transient protection device 20 can be coupled to the electronic components and equipment 36.

Connectors 16*a,* 16*b* are used to couple transmission lines 12*a,* 12*b,* respectively, to circuit board 22. Circuit board 22 may be an RF circuit board or any other type of circuit board capable of holding or receiving electronic chips. The electronic chips can also be integrated with the circuit baord 22. The inner conductors 14*a,* 14*b* of the transmission lines 12*a,* 12*b* are coupled to the transient protection device 20 using traces 18*a* and 18*b*. Traces 18*a,* 18*b,* and 18*c* may be any conductive material such as solder capable of transferring electrical energy. The transient protection device 20 is preferably suitable for surface mount technology, such as mounting on circuit board 22. The transient protection device 20 protects electronic components and equipment 36 from an electrical surge that can damage or destroy the electronic components and equipment 36 and the circuit board 22. Typically, the transmission lines 12*a,* 12*b* and the transient protection device 20 have matched impedance, i.e. 50 ohms, during normal operation.

The transient protection device 20 can operate over the entire electromagnetic frequency range. In an embodiment, the transient protection device 20 can operate at a frequency range of between approximately 800 MHz to 50 GHz; within which the insertion loss is less than 1 dB, the VSWR is less than 2:1, the power consumption is less than 100 watts, and the typical throughput energy is approximately 10 uJ. These values can vary depending on the desired frequency range of operation, degree of surge protection, and RF performance desired. The transient protection device 20 may also be used within or extending between one or more of the following frequency bands: ELF, VLF, LF, MF, HF, VHF, UHF, EHF, SHF, microwave, millimeter wave, IR, visible, UV, and X-ray bands.

The transient protection device 20 has three ports: a surge port 28, a protected port 32, and a ground port 30. The surge port 28 receives and/or transmits transmission signals from and to transmission line 12*a* and receives a surge or electrical energy from transmission line 12*a.* The surge port 28 may also be referred to as an input port. The ground port 30 dissipates or discharges the surge or electrical energy to a system ground 34. Trace 18*c* is used to connect ground port 30 to a ground plane 24. Ground plane 24 is made from a conductive material such as tin. Wire 26 is used to connect the ground plane 24 to the system ground 34. The protected port 32 receives and/or transmits transmission signals from and to the circuit board 22. The protected port 32 may also be referred to as an output port.

An electrical surge can arise in many different situations, however, typically arises when a lightning bolt strikes an antenna (not shown) or transmission line 12*a.* A lightning surge consists of D.C. electrical energy and A.C. electrical energy up to approximately 1 MHz in frequency. Generally, the lightning surge travels along the inner conductor 14*a* of transmission line 12*a* to circuit board 22. When the surge reaches the circuit board 22, the transient protection device 20 attenuates or blocks the surge from reaching the electronic components and equipment 36 and directs the surge from the surge port 28 to the ground port 30. Hence, the transient protection device 20 is the first component on the circuit board 22 that the surge reaches. The surge does not reach the protected port 32 because the transient protection device 20 acts as a capacitor to attenuate or block the surge. In an embodiment, the capacitance created by the transient protection device 20 is approximately 40 pF. One of ordinary skilled in the art will known that the capacitance value can vary and still be within the scope of the present invention.

During normal operation of the transient protection device 20, the circuit board 22 receives and/or transmits transmission signals via transient protection device 20. Hence, the transient protection device 20 operates in a bidirectional manner.

Figure 2:
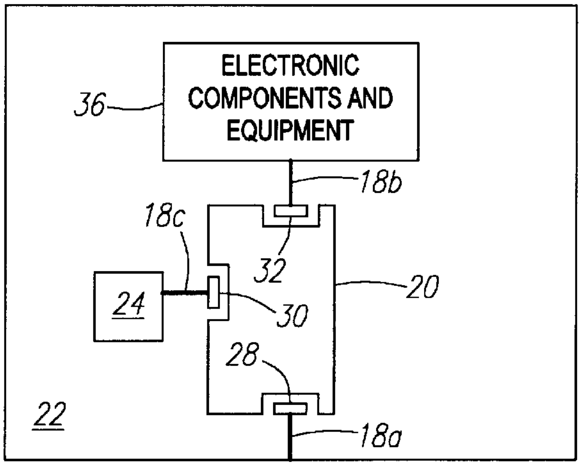
FIG. 2 depicts a simplified view of a circuit board having electronic components and equipment and a transient protection device according to an embodiment of the present invention.

FIG. 2 depicts a simplified view of a circuit board having electronic components and equipment and a transient protection device according to an embodiment of the present invention. In an aspect of the invention, the transient protection device 20 and the electronic components and equipment 36 can be mounted on the circuit board 22. The electronic components and equipment 36 may include semiconductor and electronic chips, capacitors, diodes, resistors, and other RF and D.C. components. The electronic components and equipment 36 are configured to receive a signal from the transient protection device 20. In an aspect of the invention, the signal received from the surge port 28 is propagated through the body of the transient protection device 22 to the protected port 32. The protected port 32 allows the signal to pass to one or more chips on the circuit board 22.

Figure 3:
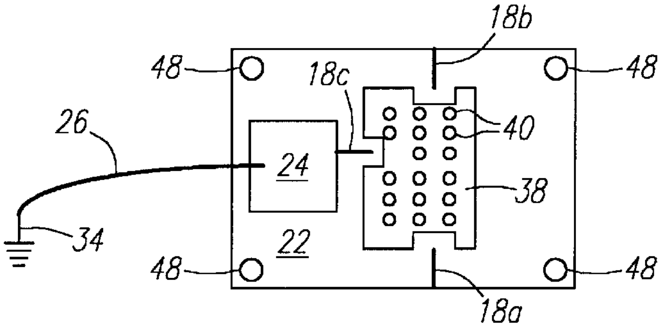
FIG. 3 depicts a top plan view of a circuit board according to an embodiment of the present invention.

FIG. 3 depicts a top plan view of a circuit board according to an embodiment of the present invention. Circuit board 22 includes a ground plane 24, traces 18*a,* 18*b,* and 18*c,* a ground pad 38, a number of circuit board holes 40, and a number of mounting holes 48. The ground pad 38 is made from a conductive material such as tin. The transient protection device 20 is generally mounted onto the ground pad 38. In an aspect of the invention, the transient protection device 20 either partially or completely may be incorporated or formed as part of the circuit board 22. Also, the transient protection device 20 either partially or completely may be integral with the circuit board 22. For example, a conductive trace 54 can be formed as part of circuit board 22 (see also, e.g., FIG. 7).

The circuit board holes 40 are round in shape and have a diameter of approximately 0.03 inches. The shape, size, and number of circuit board holes 40 may vary depending on the size and shape parameters of the transient protection device 20. For example, the shape of the circuit board holes 40 may be square, rectangular, triangular, and trapezoidal. In an aspect of the invention, one circuit board hole may be 0.15 inches from another adjacent circuit board hole. The mounting holes 48 are used to mount and secure the circuit board 22 to a housing (not shown). The housing provides protection from external conditions such as rain, snow, and the like. Generally, the transient protection device 20 and the circuit board 22 are positioned within a cavity (not shown) of the housing.

Figure 4:
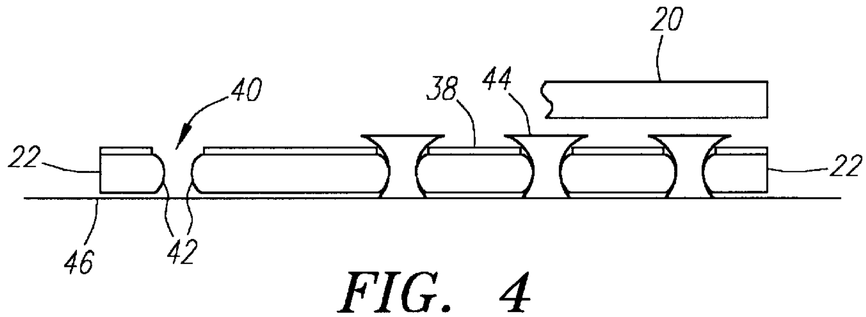
FIG. 4 depicts a side view of the circuit board and a portion of the transient protection device according to an embodiment of the present invention.

FIG. 4 depicts a side view of the circuit board and a portion of the transient protection device according to an embodiment of the present invention. For simplicity, only a portion of the transient protection device 20 is shown in FIG. 4. To couple the transient protection device 20 to a circuit board ground 46, solder material 44 is generally placed in the circuit board holes 40 and on the ground pad 38. The solder material 44 travels through the number of circuit board holes 40 to provide an electrical and mechanical connection between the transient protection device 20 and the circuit board ground 46. After the solder material is applied in the circuit board holes 40, the transient protection device 20 is placed on the ground pad 38 so that the transient protection device 20 contacts the circuit board 22. The solder material 44 is a conductive material that provides the electrical connection between the transient protection device 20 and the circuit board ground 46. The circuit board ground 46 may be a layer of conductive material coated onto the bottom of the circuit board 22. Alternatively, the circuit board ground 46 may be a layer of conductive material coupled to the solder material 44. To enhance the connection between the transient protection device 20 and the circuit board ground 46, the inside edges 42 of the circuit board holes 40 are coated with a conductive material such as tin.

In an aspect of the invention, the ground plane 24 is isolated from the circuit board ground 46 (see also FIG. 3). Generally, the ground plane 24 is connected to the system ground 34, e.g., a chasis ground, to prevent connecting the ground plane 24 directly to the circuit board ground 46. When the ground plane 24 is isolated from the circuit board ground 46, surge energy will be discharged to the system ground 34 directly rather than being discharged on the circuit board ground 46 then the system ground 34. Isolating the circuit board ground 46 from the system ground 34 prevents a surge that has reached the ground plane 24 from discharging its electrical energy onto the circuit board 22.

Figure 5:
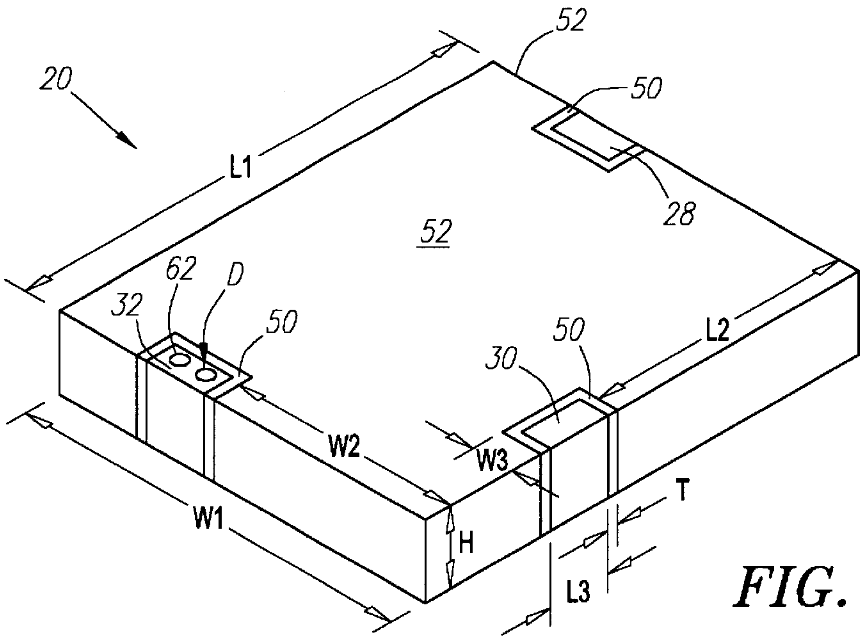
FIG. 5 depicts a top perspective view of the transient protection device according to an embodiment of the present invention.

FIG. 5 depicts a top perspective view of the transient protection device according to an embodiment of the present invention. In an aspect of the invention, the transient protection device 20 has a length L1, a width W1, and a height H. Preferably, the length L1 is approximately 1.02 inches, the width W1 is approximately 0.52 inches, and the height H is approximately 0.18 inches. The ground port 30 is positioned a length L2 from the right edge of the transient protection device 20. Typically, the length L2 is approximately 0.50 inches. The protected port 32 is positioned a width W2 from the bottom edge of the transient protection device 20. Typically, the width W2 is approximately 0.29 inches. The surge port 28 is positioned across from the protected port 32. The surge port 28, the protected port 32, and the ground port 30 have a length L3 and a width W3. Preferably, the length L3 is approximately 0.08 inches and the width W3 is approximately 0.08 inches. In an aspect of the invention, the protected port 32 has two protected port holes 62. Protected port holes 62 pass through a portion of the protected port 32 for providing a connection between the transient protection device 20 and trace 18*b* (see also FIG. 1). Each protected port hole 62 has a diameter D. Typically, the diameter D is approximately 0.03 inches. In an aspect of the invention, the protected port holes 62 may pass through the entire protected port 32.

Three side of the surge port 28, the protected port 32, and the ground port 30 are surrounded by insulating zones 50 having a width T. Typically, the width T of the insulating zones 50 is approximately 0.03 inches. The insulating zones 50 are typically made from a dielectric material such as Teflon. Insulating zones 50 isolate the surge port 28, the protected port 32, and the ground port 30 from the body 52 of the transient protection device 20. Typically, the insulating zones 50 are unplated. For identification purposes, the body 52 of the transient protection device 20 refers to the transient protection device 20 excluding the surge port 28, the protected port 32, the ground port 30, and the insulating zones 50. The above values for L, D, W, T, and H are for illustrative purposes and not intended to limit the scope of the invention. One of ordinary skilled in the art will known that these values can be modified and still be within the scope of the present invention.

Figure 6:
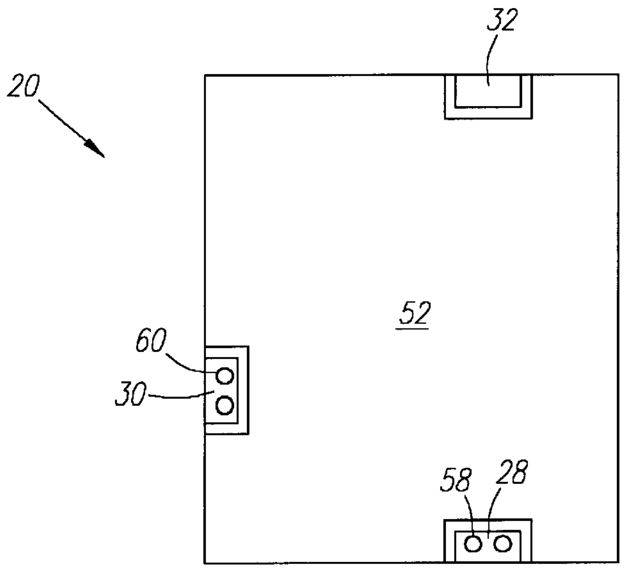
FIG. 6 depicts a bottom plan view of the transient protection device according to an embodiment of the present invention.

FIG. 6 depicts a bottom plan view of the transient protection device according to an embodiment of the present invention. In an aspect of the invention, the surge port 28 has two surge port holes 58. Surge port holes 58 pass through a portion of the surge port 28 for providing a connection between surge port 28 and trace 18*a* (see also FIG. 1). Each surge port hole 58 has a diameter D. Typically, the diameter D is approximately 0.03 inches. The surge port holes 58 may also pass through the entire surge port 28. In an aspect of the invention, the ground port 30 has two surge port holes 60. Ground port holes 60 pass through a portion of the ground port 28 for providing a connection between ground port 28 and trace 18*c* (see also FIG. 1). Each ground port hole 58 has a diameter D. Typically, the diameter D is approximately 0.03 inches. The ground port holes 58 may also pass through the entire surge port 28. The number of surge port holes 58, ground port holes 60, and protected port holes 62 can vary, e.g., 0, 1, 2, 3, etc.

Figure 7:
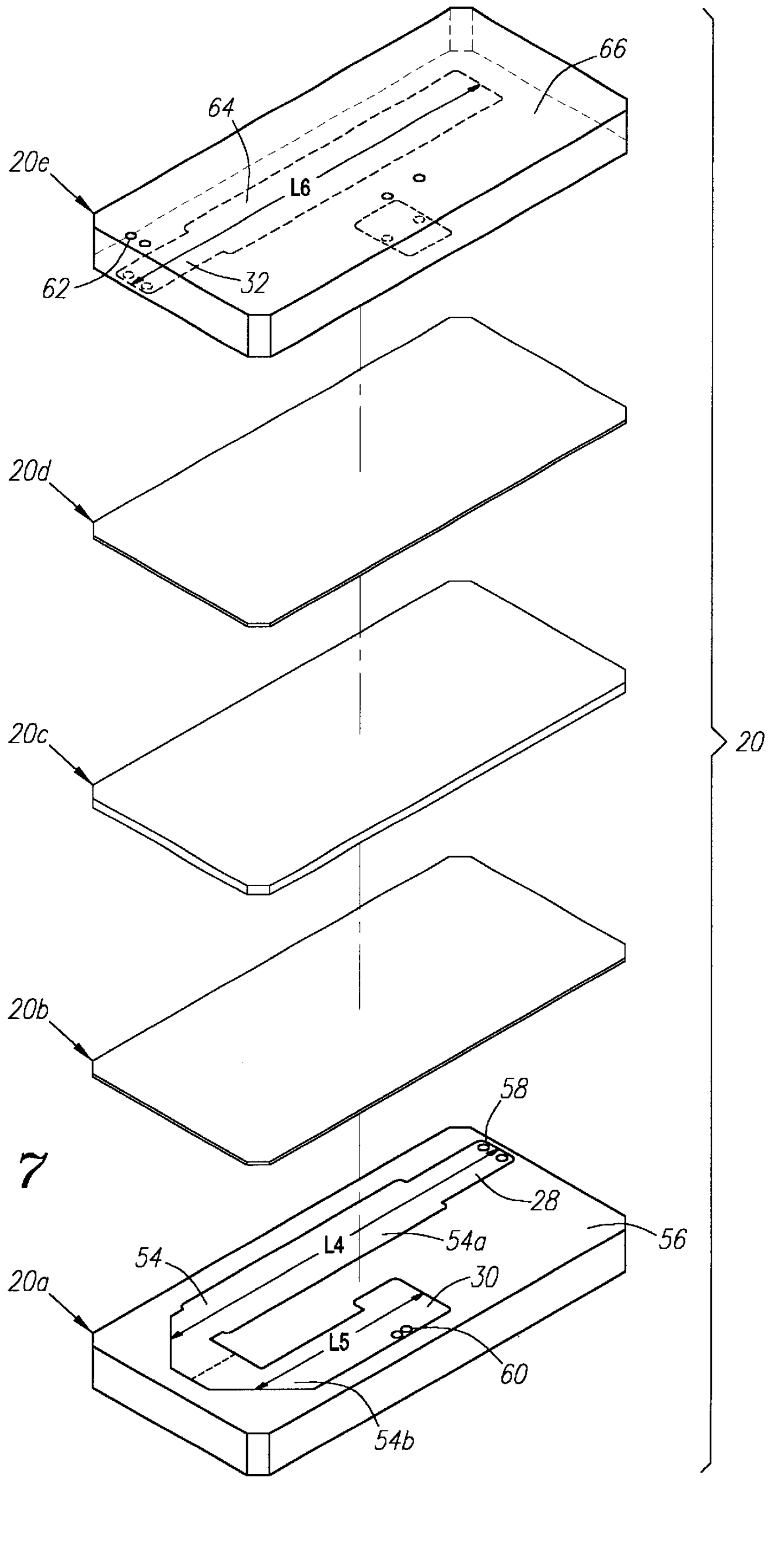
FIG. 7 depicts the multiple layers used in forming the transient protection device according to an embodiment of the present invention.

FIG. 7 depicts the multiple layers used in forming the transient protection device according to an embodiment of the present invention. A number of layers, 20*a*, 20*b*, 20*c*, 20*d*, and 20*e*, form the transient protection device 20 and create the capacitive effect to block the surge or electrical energy. The transient protection device 20 is formed by bonding these layers together. The multiple layers act as a capacitor and are used to block or attenuate D.C. electrical energy and A.C. electrical energy up to approximately 1 MHz in frequency.

The first layer 20*a* includes a conductive trace 54 and a body 56. For illustrative purposes, the conductive trace 54 will be described as having a first portion 54*a* and a second portion 54*b*. However, the conductive trace 54 is typically one continuous piece of conductive material. Typically, the conductive material is copper. The first portion 54*a* of the conductive trace 54 has a length L4. Preferably, length L4 is approximately 0.80 inches. The second portion 54*b* of the conductive trace 54 has a length L5. Length L5 is typically a ¼ wavelength of the signal transmitted to the surge port 28. In an aspect of the invention, length L5 is approximately 0.40 inches.

Conductive trace 54 is formed on a portion of the body 56 of the first layer 20*a*. Conductive trace 54 may also be formed as part of the circuit board. The conductive trace 54 is typically made from a conductive material such as plated copper. Alternatively, the conductive trace 54 may be made from a tin, gold or silver material. Generally, the impedance of the conductive trace 54 is approximately 50 ohms. The body 56 of the first layer 20*a* is made from a non-conductive or dielectric material such as Teflon that has a dielectric constant of approximately 2.3. For example, the body 56 of the first layer 20*a* may be a Taconic CER-10 material that is approximately 75 mils thick.

Generally, during a surge condition, the surge travels from the surge port 28 to the ground port 30. The surge port 28 is coupled to a first portion 54*a* of the conductive trace 54 via surge port holes 58. To improve the electrical connection between the conductive trace 54 and the circuit board 22, the inside of the surge port holes 58 are plated with a conductive material such as tin. Surge port holes 58 are used to couple the first portion 54*a* of the conductive trace 54 to the circuit board 22 (see also FIG. 1). This is accomplished by implanting or soldering metal such as tin into the surge port holes 58 so that an electrical connection is established from the conductive trace 54 to trace 18*a*. The ground port 30 is coupled to a second portion 54*b* of the conductive trace 54. Similarly, ground port holes 60 are used to couple the second portion 54*b* of the conductive trace 54 to trace 18*c* (see also FIG. 1). Hence, the surge travels from the surge port 28 along the conductive trace 54 to the ground port 30. The ground port 30 discharges the surge to the system ground 34 via grounding plate 24 and wire 26. A separate circuit board ground 46 is used by the circuit board 22 as the common ground connection for the transient protection device 20 and other chips located on the circuit board 22. The ground port 30 is isolated from the circuit board ground 46. Therefore, surge energy is discharged from the ground port 30 to the system ground 34 without contacting the circuit board ground 46. The system ground 34 may be a ground located on the chassis of the electronic components and equipment 36. In an aspect of the invention, the ground port 30 is not be connected to the circuit board ground 46 because a reverse surge may be created such that the surge propagates through the circuit board ground 46 onto the circuit board 22 and may potentially damage the transient protection device 20 and other electronic chips and components on the circuit board 22. In another aspect of the invention, the ground port 30 is connected to the circuit board ground 46.

The second layer 20*b* and the fourth layer 20*d* may be described as bonding layers. The bonding material used for the second layer 20*b* and fourth layer 20*d* is made from a non-conductive material such as Teflon. Typically, the bonding material is a Taconic "Tac-Bond" film having a thickness of approximately 1.5 mils and a permitivity of approximately 2.33.

The third layer 20*c* may be described as an insulating layer. The material used for the third layer 20*c* is made from a non-conductive material such as Teflon. Typically, the insulating layer utilizes a Taconic CER-10 material having a thickness of approximately 10 mils.

The fifth layer 20*e* includes a conductive trace 64 and a body 66. The conductive trace 64 is formed on a portion of the body 66 of the fifth layer 20*e*. The conductive trace 64 has a length L6. Preferably, length L6 is approximately 0.85 inches. The conductive trace 64 is typically made out of a conductive material such as copper and is plated with tin. Alternatively, the conductive trace 64 can be made from a copper, gold or silver material or a combination thereof. Generally, the impedance of the conductive trace 64 is approximately 50 ohms. The body 66 of the fifth layer 20*e* is made from a non-conductive or dielectric material such as Teflon which has a dielectric constant of approximately 2.3. For example, the body 66 of the fifth layer 20*e* may be a Taconic CER-10 material that is approximately 75 mils thick.

In an aspect of the invention, broadside coupling is used between conductive trace 54 and conductive trace 64. In another aspect of the invention, offset coupling is used between conductive trace 54 and conductive trace 64. The thickness and dimensions of each layer may vary depending on the capacitance, frequency range of operation, degree of surge protection, and RF performance desired.

Once the number of layers are bonded together, a metallic coating such as a tin coating is applied to the exterior of the transient protection device 20 to provide an RF shield. Alternatively, the metallic coating can be made of copper, aluminum, gold, or silver. In an aspect of the invention, the metallic coating is applied to the exterior of the transient protection device 20 except the metallic coating is not applied onto the insulating zones 50. In addition, the metallic coating may act as a heat sink to dissipate some of the surge energy. Small fins (not shown) can also be attached to top of the transient protection device 20 to further enhance the heat sinking capabilities of the transient protection device 20. Generally, the fins are made of a conductive material such as metal.

During normal operation, the RF signal travels from the surge port 28 to the protected port 32. The layers of the transient protection device 20 provide a 50 ohm impedance so that the RF signal may travel through the transient protection device 20 with a low VSWR. In particular, the RF signal travels along conductive trace 54 and conductive trace 64 onto the RF board via protected port holes 62.

Figure 8:
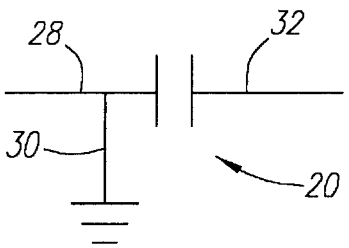
FIG. 8 depicts a simplified schematic diagram of the transient protection device according to an embodiment of the present invention.

FIG. 8 depicts a simplified schematic diagram of the transient protection device according to an embodiment of the present invention. During a surge condition, the surge port 28 receives a surge and the transient protection device 20 acts as a capacitor to block the surge energy and discharges the surge energy to ground plate 24 via ground port 30. During normal operation, transmission signals are transmitted from the surge port 28 to the protected port 32. In addition, transmission signals may be transmitted from the protected port 32 to the surge port 28.

Figure 9:
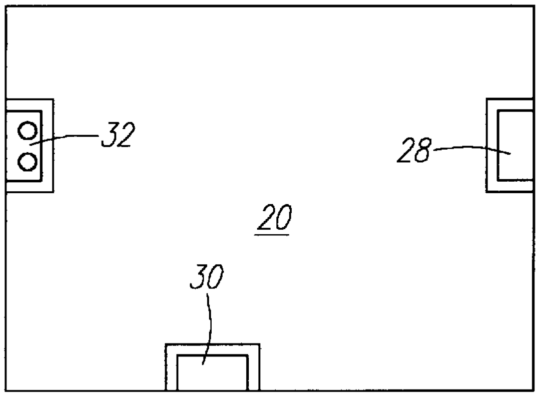
FIG. 9 depicts a top plan view of the transient protection device according to an embodiment of the present invention.

FIG. 9 depicts a top plan view of the transient protection device according to an embodiment of the present invention. The surge port 28, ground port 30, and protected port 32 are depicted at certain locations on the transient protection device 20. The surge port 28, ground port 30, and protected port 32 may be positioned at alternate locations on the transient protection device 20. For example, the surge port 28 does not have to be positioned directly across from the protected port 32.

Figure 10:
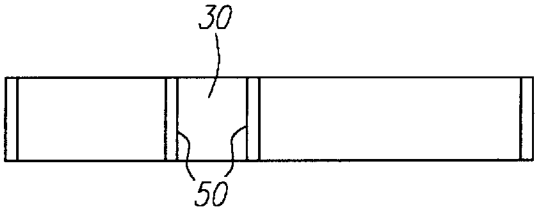
FIG. 10 depicts a front view of the transient protection device according to an embodiment of the present invention.

FIG. 10 depicts a front view of the transient protection device according to an embodiment of the present invention. As described above, the insulating zone 50 surrounds the ground port 30. The insulating zone 50 is used to isolate the ground port 30 from the circuit board ground (not shown).

Figure 11:
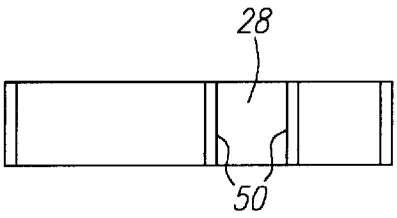
FIG. 11 depicts a side view of the transient protection device according to an embodiment of the present invention.

FIG. 11 depicts a side view of the transient protection device according to an embodiment of the present invention. As described above, the insulating zone 50 surrounds the surge port 28 and the protected port 32 (not shown). The insulating zone 50 is used to isolate the surge port 28 and the protected port 32 (not shown) from the circuit board ground (not shown).

Figure 12:
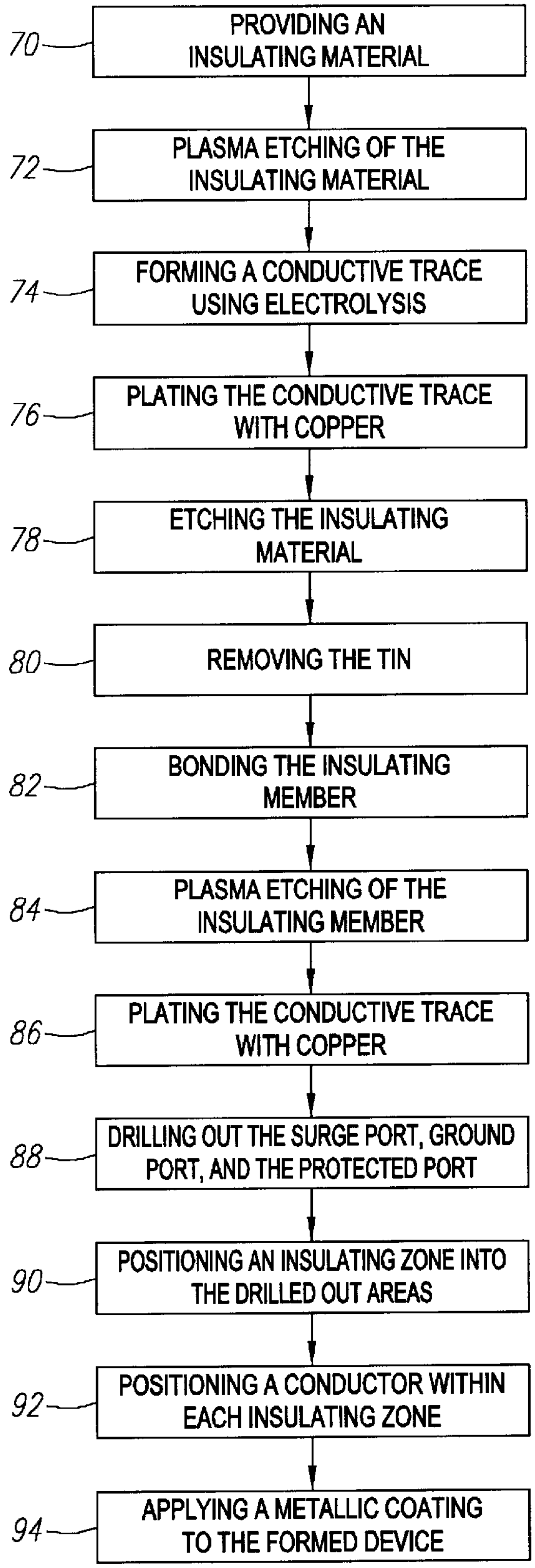
FIG. 12 depicts a simplified flowchart describing a method of manufacturing the transient protection device.

FIG. 12 depicts a simplified flowchart describing a method of manufacturing the transient protection device. At step 70, an insulating material is provided having a thickness of approximately 75 mils. The insulating member is cut into a rectangle having a size of approximately 1.02 inches by 0.52 inches. Typically, the insulating material is made from a Teflon material. The surface of the insulating material is treated using a plasma etching at step 72. A conductive trace is formed at step 74 using electrolysis to deposit copper onto the insulating material. At step 76, the conductive trace is plated with copper. The insulating material is then etched at step 78. The tin is removed at step 80 to prepare the surface for bonding. At step 82, bonding is performed at a temperature of approximately 215° C., at a pressure of 115 pounds per square inch (psi), and for a time of approximately 1 hour and 20 minutes. Plasma etching is performed at step 84 to treat the surface of the insulating material. At step 86, the conductive trace is plated with copper. The individual components such as the surge port, the ground port, and the protected port are drilled out at step 88. An insulating zone is positioned into the drilled out areas at step 90. At step 92, a conductor is positioned within each insulating member to form the surge port, the ground port, and the protected port. Applying a metallic coating to the exterior of the formed device is performed at step 94. Generally, the metallic coating is made from a tin material. Step 94 can also be altered to applying the metallic coating to the exterior of the transient protection device without applying the metallic coating to the insulating zones (see FIG. 5).

Although an embodiment is shown with a particular transient protection device, it is not required that the exact elements described above be used in the present invention. Thus, the transient protection device is to show some embodiments and not to limit the invention.

The invention has now been explained with reference to an embodiment. Other embodiments will be apparent to one of ordinary skill in the art. It is therefore not intended that the invention be limited, except as indicated by the appended claims.

What is claimed is:

1. A stripline transient protection device comprising:

a first conductive path having a first portion and a second portion and lying in a first plane, the first portion configured to receive a signal and a surge, and the second portion configured to divert the surge to a ground;

a second conductive path lying in a second plane spaced apart from the first plane, wherein the first portion of the first conductive path is configured to couple the signal to the second conductive path; and a dielectric material lying in a third plane disposed between the first plane and the second plane.

2. The stripline transient protection device of claim 1 wherein the first conductive path is broadside-coupled to the second conductive path.

3. The stripline transient protection device of claim 1 wherein the first plane is substantially parallel to the second plane.

4. The stripline transient protection device of claim 1 further comprising a first and second body, each body having a bottom surface and a top surface, the first conductive path being formed on the top surface of the first body, and the second conductive path being formed on the bottom surface of the second body.

5. The stripline transient protection device of claim 4 wherein the bottom surface of the first body and the top surface of the second body have a metallic coating to provide a shield for the signal.

6. The stripline transient protection device of claim 1 wherein the first portion has a length of approximately two times that of the second portion and the second portion has a length approximately equal to ¼ the wavelength of the signal.

7. A transient protection device mounted on a circuit board for receiving an electrical surge, said transient protection device comprising:

a protected port;

an surge port configured to receive an electrical surge, said surge port positioned substantially opposite from said protected port;

a ground port directly connected to said surge port, said ground port configured to provide a path for said electrical surge to be routed to a ground; and a body having a plurality of insulating layers, said body positioned between said protected port and said surge port, said body configured to block said electrical surge from traveling to said protected port.

8. The transient protection device of claim 7 further comprising an insulating zone positioned between said surge port and said body.

9. The transient protection device of claim 7 wherein said body is coated with a metallic material.

10. The transient protection device of claim 9 wherein said metallic material is selected from a group consisting of tin, copper, gold, and silver.

11. A surge suppressor comprising:

an input port configured to receive a signal and a surge;

an output port configured to transmit said signal;

a ground port directly connected to said input port and a aground, said ground port configured to discharge said surge to said ground; and an insulating layer lying in a first plane and interposed between said input port and said output port, said insulating layer configured to pass said signal and attenuate said surge.

12. The surge suppressor of claim 11 further comprising a first conductive trace lying in a second plane which is substantially parallel to the first plane, said first conductive trace coupling said input port to said ground port.

13. The surge suppressor of claim 12 wherein a portion of said first conductive trace has a length of ¼ wavelength of said signal.

14. The surge suppressor of claim 12 further comprising a second conductive trace coupled to said output port.

15. A surge suppression system comprising:

a circuit board; and a surge suppressor mounted on said circuit board, said surge suppressor comprising:

a body having a top non-conductive layer and a bottom non-conductive layer;

a conductive trace having a first end and a second end and sandwiched between the top non-conductive layer and the bottom non-conductive layer;

a surge port connected to the first end and configured to receive a surge and a signal;

a ground port connected to the second end and configured to divert said surge to a system ground; and a protected port configured to transmit said signal.

16. The surge suppressor of claim 15 wherein said circuit board has a circuit board ground.

17. The surge suppressor of claim 16 wherein said system ground is isolated from said circuit board ground.

18. The surge suppressor of claim 15 wherein said protected port is coupled to an electronic chip, said electronic chip being mounted to said circuit board.

19. A surge suppressor comprising:

a first body having a top portion including a first conductive trace, said first conductive trace having a first end and a second end, said first end configured to receive a signal and said second end coupled to a system ground;

a second body having a bottom portion including a second conductive trace; and an insulating layer sandwiched between the top portion of said first body and the bottom portion of said second body.

20. The surge suppressor of claim 19 wherein said second conductive trace is configured to transmit said signal.

21. A surge suppression system comprising:

means for mounting a chip; and a surge suppressor connected to said means for mounting, said surge suppressor comprising:

a body having a top non-conductive layer and a bottom non-conductive layer;

a conductive trace having a first end and a second end and positioned between the top non-conductive layer and the bottom non-conductive layer;

means connected to the first end, for receiving a surge and a signal;

means connected to the second end, for diverting said surge to a ground; and means for transmitting said signal to said means for mounting.

22. A method of manufacturing a transient protection device comprising:

forming a first conductive trace on a first insulating material;

forming a second conductive trace on a second insulating material;

plating said first and said second conductive traces with copper;

bonding a third insulating material between said first and said second insulating materials;

drilling an opening for a surge port, a protected port, and a ground port;

positioning an insulating zone within each drilled opening; and positioning a conductor within each insulating zone.

* * * * *